United States Patent [19]

Rathbun

[11] Patent Number: 4,778,980

[45] Date of Patent: Oct. 18, 1988

[54] INSTANT-ON FUSER CONTROL

[75] Inventor: Darrel R. Rathbun, Rochester, N.Y.

[73] Assignee: Xerox Corporation, Stamford, Conn.

[21] Appl. No.: 915,440

[22] Filed: Oct. 6, 1986

[51] Int. Cl.$^4$ ............................................. H05B 1/02
[52] U.S. Cl. .................................... 219/499; 219/497; 219/501; 219/216; 323/235
[58] Field of Search ............... 219/501, 494, 497, 499, 219/507–509, 216, 212; 323/235, 236, 319; 307/117

[56] References Cited

U.S. PATENT DOCUMENTS

| | | | |
|---|---|---|---|
| 3,256,002 | 6/1966 | Hudson | 263/3 |
| 3,268,351 | 8/1966 | VanDorn | 117/21 |
| 3,471,683 | 10/1969 | Bogue | 219/469 |
| 3,498,596 | 3/1970 | Moser | 263/6 |
| 3,666,447 | 5/1972 | Sawbestre | 75/108 |
| 3,669,706 | 6/1972 | Sanders et al. | 117/21 |
| 3,789,190 | 1/1974 | O'rosy et al. | 219/499 |
| 3,874,892 | 4/1975 | McInally | 117/6 |
| 3,898,424 | 8/1975 | Thettu | 219/216 |
| 3,946,200 | 3/1976 | Juodikis | 219/499 |
| 3,948,214 | 4/1976 | Thettu | 118/60 |
| 3,953,709 | 4/1976 | Elter | 219/216 |
| 4,086,466 | 4/1978 | Scharlack | 219/494 |
| 4,320,284 | 3/1982 | Dannatt | 219/469 |
| 4,355,225 | 10/1982 | Marsh | 219/216 |
| 4,377,739 | 3/1983 | Eckert, Jr. et al. | 219/497 |
| 4,395,109 | 7/1983 | Nakajima et al. | 355/3 FU |
| 4,471,210 | 9/1984 | van den Eijnden | 219/216 |
| 4,506,146 | 3/1985 | Rice et al. | 219/499 |
| 4,636,619 | 1/1987 | Sugimori | 219/499 |

OTHER PUBLICATIONS

NASA Report No. TN-7248, May 1973, Author Maxwell G. Stange; Title: Implementation of a Self-Controlling Heater.
Electronic Design 22, Oct. 25, 1979, Title: Simplify and Improve Heat Control by Combining Temperature Sensor & Heater.
Xerox Pending Patent Appln. 893,753, filed Aug. 6, 1986 (not enclosed).
Xerox Pending Patent Appln. 893,852, filed Aug. 6, 1986 (not enclosed).
NASA Tech Brief, Dec. 1974 (Goddard Space Flight Center); Title: Implementation of a Self-Controlling Heater: A Concept.

Primary Examiner—M. H. Paschall
Attorney, Agent, or Firm—Ronald F. Chapuran

[57] ABSTRACT

A fuser temperature control using a resistive bridge driven power circuit. At the beginning of each positive half cycle of the AC line voltage, the possible firing of the triac is delayed by 100 microseconds. During this delay, the fuser temperature is checked by measuring the foil heaters resistance with a DC bridge circuit. One leg of this bridge circuit contains the foil heater. The other leg of the bridge has a potentiometer to set the temperature of the fuser. The output of the bridge circuit is fed into a differential comparator and D-type flip-flop. This combination gives high gain with very little sensitivity to noise. The differential comparator checks the fuser temperature (foil resistance) relative to the set point temperature (set point potentiometer). It determines whether the fuser temperature is above or below the set point temperature. The D-type flip-flop latches this information to either enable or disable the triac triggering circuitry for each full cycle of the line voltage. When the fuser temperature is below the set point temperature, power is enabled to heat the fuser. When the fuser temperature is above the set point temperature it is disabled to cool the fuser. This power decision is made at a rate of 60 Hz in order to keep up with the fusers instant-on characteristics.

1 Claim, 5 Drawing Sheets

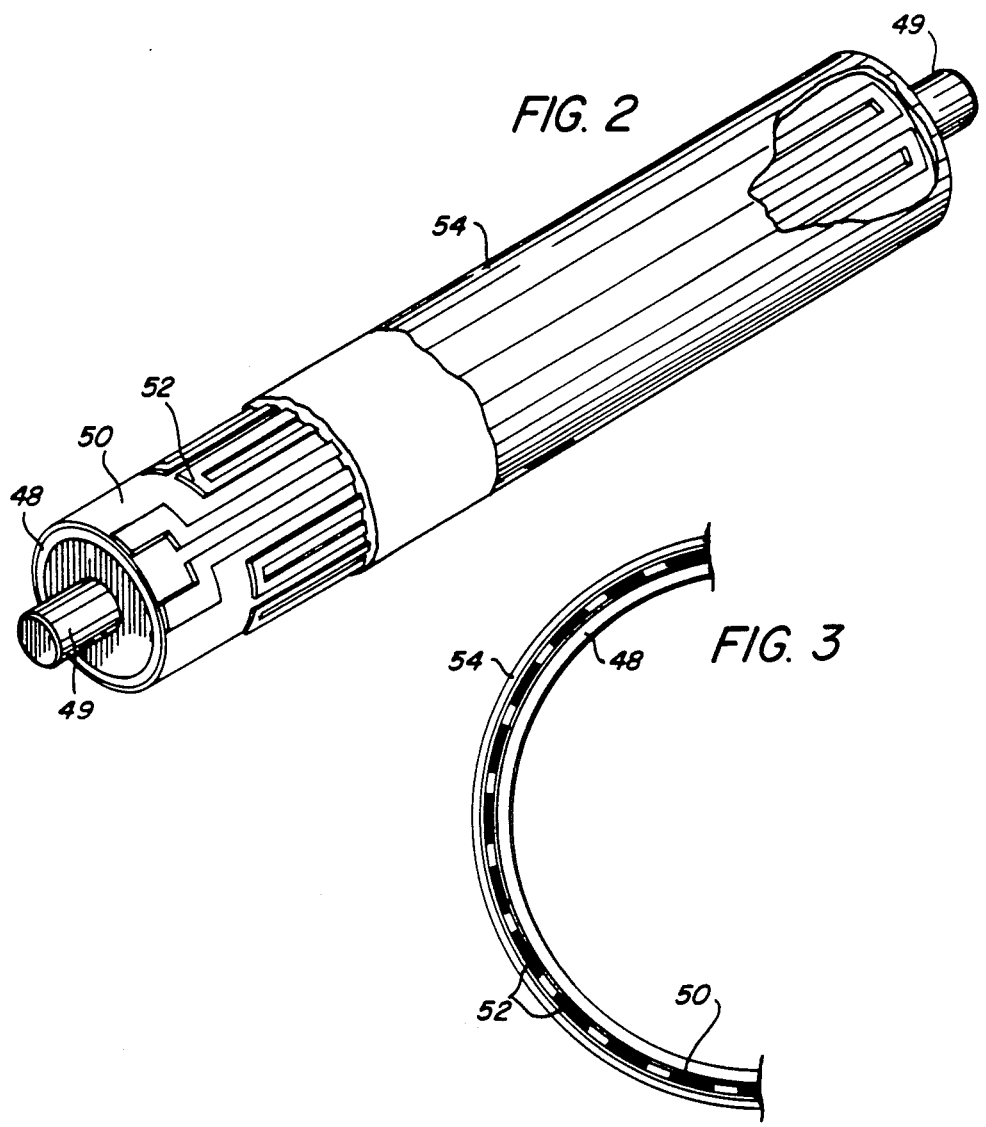

INSTANT-ON FUSER CONTROL

This invention relates to an improved fuser apparatus, and more particularly to an instant-on fuser control.

BACKGROUND OF THE INVENTION

In order to fuse electroscopic toner material permanently onto a support surface by heat, it is usually necessary to elevate the temperature of the toner material to a point at which the constituents of the toner materials coalesce and become tacky. This heating causes the toner to flow to some extent into the fibers or pores of the support member. Thereafter, as the toner material cools, solidification of the toner material causes the toner material to become firmly bonded to the support member.

The use of thermal energy for fixing toner images onto a support member is well known. Several approaches to thermal fusing of electroscopic toner images have been described in the prior art. These methods include providing the application of heat and pressure substantially concurrently by various means, for example, a roll pair maintained in pressure contact, a flat or curved plate member in pressure contact with a roll, and a belt member in pressure contact with a roll.

Heat may be applied by heating one or both of the rolls, plate members or belt members. The fusing of the toner particles takes place when the proper combination of heat, pressure and contact time are provided typically, in such direct contact systems, the roller surface may be dry, i.e. no application of a release agent to the surface of the roller as described, for example, in U.S. Pat. Nos. 3,498,596 and 3,666,447. Alternatively, the fuser roll surface may be wetted with a release agent such as a silicone oil as described in U.S. Pat. Nos. 3,268,351 and 3,256,002. It is also known in the art to fuse toner images by the use of a flash fusing process, for example, as disclosed in U.S. Pat. No. 3,874,892. In such a process, a flash lamp is generally pulsed on for a very short period of time. It can be appreciated that since the lamp is pulsed or flashed for short period of time, a large amount of power must be used to accomplish the fusing of the toner particles.

Another method for fusing toner images to a substrate is radiant fusing. Radiant fusing differs from flash fusing in that in radiant fusing, the radiant energy source, typically and infrared quartz lamp, are turned on during the entire fusing step rather than pulsed for a short period of time as in flash fusing. Examples of radiant fuser apparatus are shown in U.S. Pat. Nos. 3,898,424 and 3,953,709. Such prior art radiant fusers are generally made of relatively heavy metallic construction which requires the constant use of a heating element to maintain the apparatus at standby temperature. U.S. Pat. No. 3,471,683 shows a heater roll with a printed circuit heating element. However, the heater roll is relatively thick and the adhesive material not suitable for relatively high temperature operation.

Such prior art fusing systems have been effective in providing the fusing of many copies in relatively large, fast duplicating machines, in which the use of standby heating elements to maintain the machine at or near its operating temperature can be justified. However, there is a continuing need for an instant-on fuser which requires no standby power for maintaining the fuser apparatus at a temperature above the ambient. It is known to use a positive characteristic thermistor having a self-temperature controlling property as a heater for a heating roller. The roller is regulated to a prescribed temperature by a heating control temperature detection element. It is known to employ radiation absorbing materials for the fuser roll construction to effect faster warm-up time as described in U.S. Pat. No. 3,669,706. It is also disclosed in U.S. Pat. No. 4,355,225 to use an instant-on radiant fuser apparatus made of a low mass reflector thermally spaced from a housing, with the housing and the reflector together forming a conduit for the passage of cooling air therein. A low mass platen is provided which is constructed to achieve an operating temperature condition in a matter of a few seconds without the use of any standby heating device. It is also known as disclosed in U.S. Pat. No. 3,948,214 to use a cylindrical member having a first layer made of elastometic material for transporting radiant energy, a second layer for absorbing radiant energy, and a third layer covering the second layer to affect a good release characteristic on the fuser roll surface. The fuser roll layers are relatively thin and have an instant-start capability. U.S. Pat. No. 4,395,109 discloses an instant-on fuser having a core of metal or ceramic supporting a fuser roller, and including a heat insulating layer, an electrically insulating layer and a protective layer formed on the outer circumference of the core.

It is also known as described in copending patent applications, U.S. Ser. No. 893,753 filed Aug. 6, 1986 and U.S. Ser. No. 893,852 filed Aug. 6, 1986 to instant-on fuser apparatus having a relatively low thermal mass designed for relative ease of construction and that has a relatively high mechanical strength.

The prior art is also replete with general heating control circuits. For example, U.S. Pat. No. 4,086,466 discloses an automatic heater controller responsive to the resistance of a heater element. The control circuit contains both an AC and DC power source. The resistance of the heating element is monitored by a DC voltage sensing means, which supplies an output signal to a comparator amplifier. The comparator is connected to a control means, which adjusts the power supplied to the heating element from an AC power source. U.S. Pat. No. 4,377,739 discloses an average power apparatus used for controlling the power supplied to a fuser in an electrophotographic machine. The apparatus comprises a power monitor which measures the average power supplied to the fuser. The measured average power level is compared to a "set" power level. The apparatus further comprises a digital network which receives an input signal from the power monitor and adjusts the average power level of the fuser to match the "set" power level.

U.S. Pat. No. 3,946,200 discloses a proportional temperature controller comprising an improved bridge circuit. One arm of the bridge circuit contains a temperature sensitive resistor. The other arm of the bridge circuit comprises a network of resistors containing a setting resistor which is linearly calibrated in terms of temperature. The temperature controller further comprises an operational amplifier which controls the supply of power to a heating element based on the degree of imbalance between the two arms of the bridge circuit. U.S. Pat. No. 4,471,210 to van den Eijnden discloses a fuser heat control circuit for controlling the temperature of a rotatable drum in a photocopying machine. Disposed on the drum is a temperature-sensitive resistor which varies in resistance as a function of the drum temperature. A control circuit supplies power to the fuser heating element in accordance with the varying resistance of the temperature-sensitive resistor.

U.S. Pat. No. 4,320,284 to Dannatt discloses a heated fuser roll comprising a plurality of wafer shaped heating elements. The heating elements are formed of a semiconducting ceramic material exhibiting a positive temperature coefficient of resistance. The resistance of the semiconducting wafers increases with increasing temperature. After a short operating time the semiconducting wafers reach a state of equilibrium, wherein the power supplied and absorbed by the wafers is equal to the heat dissipated by the wafers. By using the semiconducting wafers, the fuser roll has the ability to operate as a self-regulating heat source. Other examples of self-controlling heaters are described in NASA Tech Brief, December 1974; NASA Report No. TN D-7248, May 1973; and Electronic Design, 22, Oct. 25, 1979.

One difficulty with prior art fusers is that the fusers are often controlled using an external temperature sensor. Such sensors mean additional cost to the system. Another difficulty with prior art fuser controls is that the controls do not have a short enough response time for an instant-on fuser to allow the fast warm up of the fuser. Other prior art fuser controls are relatively complex and not adapted to the environment of a xerographic machine fuser control. It is an object, therefore, of the present invention to provide a new and improved control for an instant-on fuser. It is another object of the present invention to provide a control for an instant-on fuser that is relatively simple and does not require an external temperature sensor. It is a further object of the present invention to provide a fuser control for a fuser capable of being heated from room temperature to fusing temperature in less than 10 seconds. It is another object of the present invention to provide thermal circuits with a special material for the foil heater to control an instant-on fuser. Further objects and advantages of the present invention will become apparent as the following description proceeds and the features of novelty characterizing the invention will be pointed out with particularity in the claims annexed to and forming a part of this specification.

SUMMARY OF THE INVENTION

The present invention is the control of fuser temperature using a resistive bridge driven power circuit. A triac is used to gate power to the foil fabricated from special material exhibiting a temperature dependent resistance to correlate fuser resistance and temperature. At the beginning of each positive half cycle of the AC line voltage, the possible firing of the triac is delayed by 100 microseconds. During this delay, the fuser temperature is checked by measuring the foil heaters resistance with a DC bridge circuit. One leg of this bridge circuit contains the foil heater. The other leg of the bridge has a potentiometer to set the temperature of the fuser. The output of the bridge circuit is fed into a differential comparator and D-type flip-flop. This combination gives high gain with very little sensitivity to noise. The differential comparator checks the fuser temperature (foil resistance) relative to the set point temperature (set point potentiometer). It determines whether the fuser temperature is above or below the set point temperature. The D-type flip-flop latches this information to either enable or disable the triac triggering circuitry for each full cycle of the line voltage. When the fuser temperature is below the set point temperature, power is enabled to heat the fuser. When the fuser temperature is above the set point temperature it is disabled to cool the fuser. This power decision is made at a rate of 60 Hz in order to keep up with the fusers instant-on characteristics.

BRIEF DESCRIPTION OF THE DRAWINGS

For a better understanding of the present invention, reference may be had to the accompanying drawings, wherein the same reference numerals have been applied to like parts and wherein:

FIG. 2 is an isometric view of the instant-on fuser apparatus shown in FIG. 1;

FIG. 3 is a cross-sectional view of the apparatus of FIG. 2;

DESCRIPTION OF THE INVENTION

Figure 1:
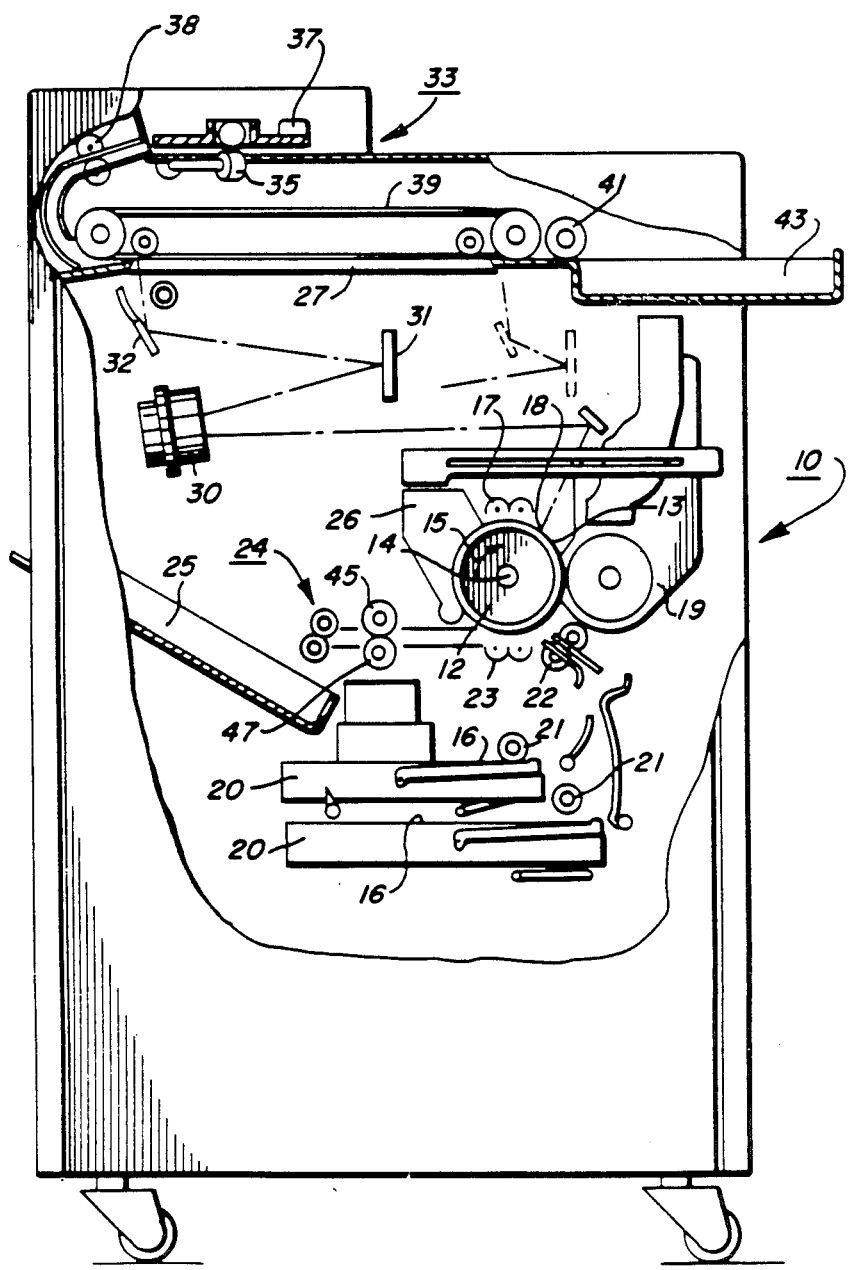
FIG. 1 is an illustration of a reproduction machine incorporating the present invention.

Referring now to FIG. 1, there is shown by way of example an automatic xerographic reproducing machine 10 including an image recording drum-like member 12, its outer periphery coated with suitable photoconductive material or surface 13. The drum 12 is suitably journaled for rotation within a machine frame (not shown) by means of shaft 14 and rotates in the direction indicated by arrow 15 to bring the image-bearing surface 13 thereon past a plurality of xerographic processing stations. Suitable drive means (not shown) are provided to power and coordinate the motion of the various cooperating machine components whereby a faithful reproduction of the original input information is recorded upon a sheet of final support material or copy sheet 16.

Initially, the drum 12 moves the photoconductive surface 13 through a charging station 17 providing an electrostatic charge uniformly over the photoconductive surface 13 in a known manner preparatory to imaging. Thereafter, the drum 12 is rotated to exposure station 18 and the charged photoconductive surface 13 is exposed to a light image of the original document to be reproduced. The charge is selectively dissipated in the light exposed regions to record the original document in the form of an electrostatic latent image. After exposure, drum 12 rotes the electrostatic latent image recorded on the photoconductive surface 13 to development station 19 wherein a conventional developer mix is applied to the photoconductive surface 13 of the drum 12 rendering the latent image visible. Typically, a suitable development system utilizing a magnetizable developer mix having coarse ferromagnetic carrier granules and toner colorant particles.

The copy sheets 16 of the final support material are supported in a stack arrangement on an elevating stack support tray 20. With the stack at its elevated position a sheet separator 21 feeds individual sheets therefrom to the registration system 22. The sheet is then forwarded to the transfer station 23 in proper registration with the image on the drum. The developed image on the photoconductive surface 13 is brought into contact with the sheet 16 of final support material within the transfer station 23 and the toner image is transferred from the photoconductive surface 13 to the contacting side of the final support sheet 16.

After the toner image has been transferred to the sheet of final support material or copy sheet 16, the copy sheet 16 with the image is advanced to fusing station 24 for coalescing the transferred powder image to the support material. After the fusing process, the copy sheet 16 is advanced to a suitable output device such as tray 25.

Although a preponderance of toner powder is transferred to the copy sheet 16, invariably some residual toner remains on the photoconductive surface 13. The residual toner particles remaining on the photoconductive surface 13 after the transfer operation are removed from the drum 12 as it moves through a cleaning station 26. The toner particles may be mechanically cleaned from the photoconductive surface 13 by any conventional means, as for example, by the use of a cleaning blade.

Normally, when the copier is operated in a conventional mode, the original document to be reproduced is placed image side down upon a horizontal transparent platen 27 and the stationary original then scanned by means of a moving optical system. The scanning system includes a stationary lens 30 and a pair of cooperating movable scanning mirrors, half rate mirror 31 and full rate mirror 32 supported upon suitable carriages.

A document handler 33 can also be provided including registration assist roll 35 and switch 37. When a document is inserted, switch 37 activates registration assist roll 35 and the document is fed forward and aligned against a rear edge guide of the document handler 33. The pinch rolls 38 are activated to feed a document around 180° curved guides onto the platen 27 for copying. The document is driven by a platen belt transport including platen belt 39. After copying, the platen belt 39 is activated and the document is driven off the platen by the output pinch roll 41 into the document catch tray 43.

The fusing station 24 includes a heated fuser roll 45 and a backup or pressure roll 47 forming a nip through which the copy sheets to be fused are advanced. The copy sheet is stripped from the fuser rolls by suitable (not shown) stripper fingers. The pressure roll 47 comprises a rotating member suitably journaled for rotation about a shaft and covered with an elastomeric layer of silicone rubber PFA or any other suitable material. The fuser roll 45 comprises a rotating cylindrical member 48 mounted on a pair of end caps 49 as seen in FIG. 2 and 3.

To be instant-on, a fuser should achieve operating temperatures in a time shorter than the arrival time of the paper at the fuser, at machine start-up, approximately a 5-10 second warm-up time. This is, assume a copy sheet 16 takes from 5-10 seconds to be transported from the support tray 20 to the transfer station 23 to fuser 24 after a start print or start copy button is pushed. It is usually then necessary for the fuser to be elevated at least 120° C. The temperature rise is of the order of a 120° to 160° for a roller-type fuser. Raising the temperature of a rigid structure of a change of temperature of approximately 120°-160° C. in five seconds using reasonable power levels, for example, 700 watts, requires a small mass to be heated. The cylindrical member 48 preferably is a hollow cylinder of fiber glass, carbon graphite, or boron carbide fibers or any other suitable fiber material of suitable mechanical strength. Preferably, the thickness of the cylindrical member 48 wall is approximately 20-40 mils.

With reference to FIGS. 2 and 3, preferably supported on the filament wound cylindrical member 48 is a poly adhesive securing fiber glass backing 50. Supported on the fiber glass backing 50 is a suitable heating wire, printed circuit or photo etched circuit pattern 52. A suitable release agent 54 such as PFA or rubber covers the heating element. It should also be noted that a suitable high temperture adhesive may secure the fiber glass backing 50 to the cylindrical member 48. It should be noted that although a specific heating device is disclosed, any method of attaching a heating element to a fuser member is contemplated within the scope of the present invention.

Figure 4:
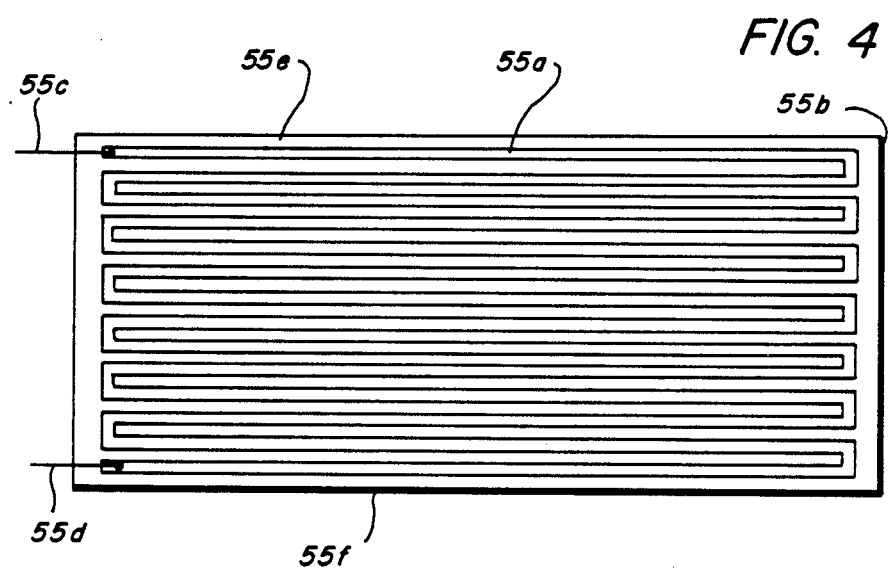
FIG. 4 is an illustration of the heating element and the instant-on fuser.

With reference to FIG. 4, a typical printed circuit 55 includes a conductive path 55a of suitable conductive material on a substrate backed by fiberglass, Kapton, Nomex, or any other suitable insulating material 55b. The opposite ends 55c and 55d of the conductive path 55a are connected to conductor 58. The legs of the conducting path are equally spaced apart so that a relatively uniform heat source is created when the backing insulating material is formed into a cylindrical shape. The cylindrical shape is formed by bringing edges 55e and 55f into opposing relationship. A high temperature adhesive sealant layer, for example, polyimide, polymidimide or suitable adhesive that is effective as a adhesive up to at least 400° F., secures the printed circuit 55 to the inside or outside surface of the member 48. It is essential to have a high temperature adhesive that is resistant to aging and high temperature. The release material 54 contacts the support sheet bearing toner images and prevents image offset to effect high quality fusing of a copy sheets. Suitable electrical leads 58 connected to the printed circuit 55 suitably extend for connection to an electrical power supply.

Figure 5:
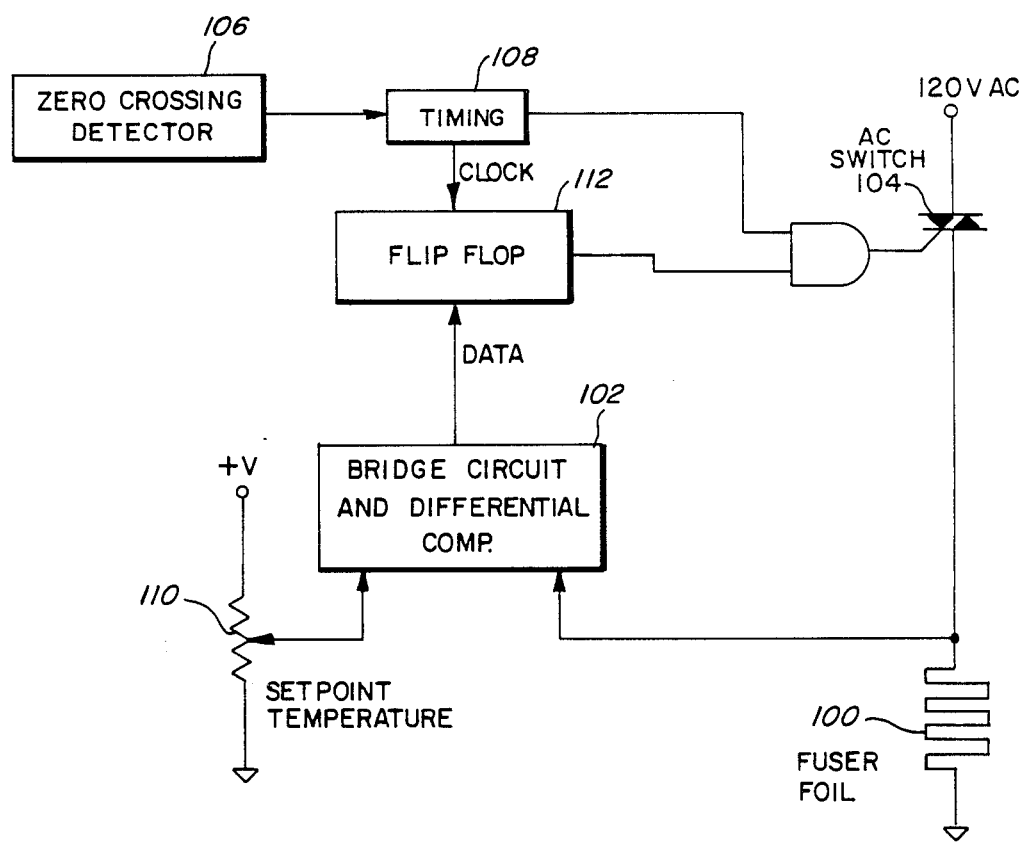
FIG. 5 illustrates a block diagram of the control.

In accordance with the present invention, with reference to FIG. 5, control of the fuser foil 100 temperature is accomplished using a resistive bridge circuit and differential comparator 102. As illustrated in FIG. 5, a triac 104 is used to gate power to the fuser foil 100. At the beginning of each positive half cycles of AC line voltage, the firing of the triac is delayed by 100 microseconds as illustrated by the zero crossing detector 106 and the timing block 108. During this delay, the fuser foil is only being powered by one leg of the bridge circuit. The other leg of the bridge has potentiometer 110 to set the temperature of the fuser.

The output of the bridge circuit and differential comparator 102 is fed to a "D"-type flip-flop 112 which is clocked before the AC switch 104 would be turned on. The combination of the bridge circuit and differential comparator 102 gives high gain amplification with very little sensitivity to noise. The output of the "D" flip-flop 112 reflects whether the fuser temperature is above or below the set point temperature. This output is used to control the power to the fuser to either heat it up or cool it down.

Figure 6:
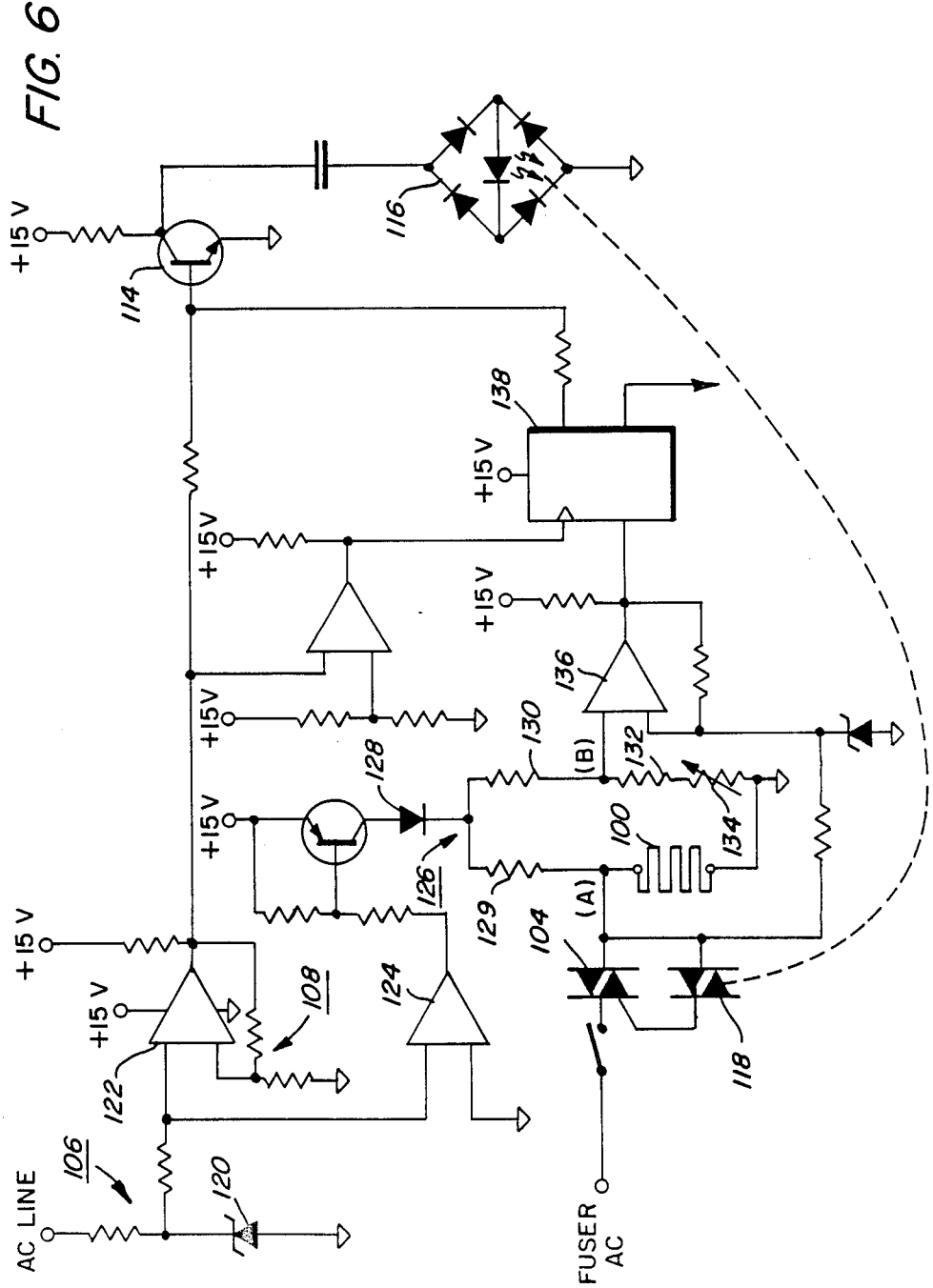
FIG. 6 is a detailed schematic of the control in accordance with the present invention.

With reference to FIG. 6, the AC switch illustrated at 104 in FIG. 5 comprises transistor 114 connected to the diode circuit 116 in turn optically coupled to the triac 118. The optically coupled triac 118 is electrically connected to triac 104 for firing power to the fuser foil 100. The zero cross over detector 106 including zener diode 120 determines each positive half cycle of the AC line voltage. The signal from the zero cross over circuitry 106 is conveyed to comparators 122 and 124 comprising part of the timing circuitry 108. In a preferred embodiment, a 100 microsecond time delay is provided by the timing circuitry 108 to turn on the AC power when appropriate and a suitable signal provided to the bridge circuit 126 through the diode 128 turns on the DC power to the bridge circuit 126 at the positive zero cross over. The 100 microsecond time delay before firing triac 104 is needed to measure the relative potentials of the bridge circuit to determine whether or not to fire the triac. The bridge circuit 126 is a differential resistive bridge circuit comprising resistor 129 and fuser foil 100 as one leg of the bridge and fixed resistors 130 and 132 and variable resistor 134 as the other leg of the bridge.

In operation, the resistance of the fuser foil 100 generally ranges from approximately 19 ohms at machine startup (room temperature) to 23 ohms at the desired fusing temperature, approximately 375° F. With the fuser resistance at 19 ohms, there is a potential of approximately 0.4 DC at point A of the bridge circuit with no AC power applied. With the resistance of the fuser foil at 23 ohms, there is approximately a potential of 0.49 volts at point A. Assuming a potential of 0.49 volts at point B of the bridge circuit and 0.4 volts at point A, the potential at point B will be relatively higher than the potential at point A providing a relatively high negative input to the differential comparator 136. The relatively high negative input to the differential comparator 136 provides a zero input signal to the flip flop 138 giving a zero output from the flip flop 138 to the base of the transistor 114. This will allow the timing pulses from timing circuit 108 to trigger the triac 104 through triac 118 and diode circuit 116. The AC power will be applied to the fuser foil 100, thus increasing the temperature of the fuser foil 100 and thereby increasing the resistance of the fuser foil 100.

As the temperature of the fuser foil increases and thus the resistance of the fuser foil rapidly increases, the potential at point A of bridge circuit increases from 0.4 volts to slightly over 0.49 volts. This upsets the relatively high balance of point B with respect to point A with result that the output of the differential comparator 136 is now a digital one (1) signal to the flip flop 138. The digital one (1) output of the flip flop 138 to the transistor 114 shorts out the timing pulses used to gate the triac 104, thus shutting off the heat output of the fuser foil 100. As the temperature of the fuser foil 100 decreases with a related decrease in the resistance of the fuser foil, the potential at point A of the bridge circuit drops below the potential at point B and the cycle reverses wherein the input to the differential comparator 136 is again a relatively high negative signal to again allow timing pulses through the transistor 114 to trigger the triac 104.

Since there is a direct relationship between the foil heater's resistance and its temperature and since the fuser has a low thermal mass, the foil resistance can be used as a good representation of the fuser's surface temperature. The temperature increase of the fuser's surface is on the order of 38° F./sec at 600μ. It should be noted that the control circuit is particularly adapted to a low mass fuser/foil heater arrangement, since the lower of the fuser mass, the more closely the resistance of the fuser foil approximates the temperature of the fuser.

While there has been illustrated and described what is at present considered to be a preferred embodiment of the present invention, it will be appreciated that numerous changes and modifications are likely to occur to those skilled in the art, an it is intended in the appended claims to cover all those changes and modifications which fall within the true spirit and scope of the present invention.

I claim:

1. An electrostatic copying machine having pressure fusing apparatus of the type including an instantly heated fuser roll and a pressure back-up roll defining a nip through which support material bearing toner images is passed for fusing the toner images onto the support material, the fuser roll being raised approximately 120° C. in less than 10 seconds, the instantly heated fuser roll including a hollow, relatively thin cylinder, the cylinder having an outside and an inside surface, the cylinder enclosing ambient air, a source of thermal energy affixed by a high temperature at least 190° C. adhesive to either the outside or inside surface of said cylinder, the source of thermal energy being a heating circuit element, the resistance of the heating circuit element varying approximately 20% as the temperature of the heated fuser roll varies from room temperature to fusing temperature, a control for the heating circuit element including:

a differential bridge circuit, the heating circuit element electrically connected to one leg of the differential bridge circuit, a variable resistor electrically connected to a second leg of the differential bridge circuit to calibrate the bridge circuit, a triac electrically connected to the heating circuit element to apply heating power to the heating circuit element, a differential comparator electrically connected to the differential bridge circuit to fire the triac, an AC power source, a zero crossing detector for determining each positive going cycle of the AC power source, and a timing logic connected to the zero crossing detector and the differential comparator to trigger the triac at least 50 microseconds after the time of crossover.

* * * * *